United States Patent [19]
Ranf et al.

[11] Patent Number: 5,486,847
[45] Date of Patent: Jan. 23, 1996

[54] APPARATUS FOR A STYLUS INPUT SYSTEM FOR SHIELDING RFI/EMI FIELDS

[75] Inventors: Karl-Heinz Ranf, Friedberg, Germany; Jack R. Penrod, Dayton, Ohio

[73] Assignee: NCR Corporation, Dayton, Ohio

[21] Appl. No.: 994,973

[22] Filed: Dec. 21, 1992

[51] Int. Cl.$^6$ ............................................. G09G 5/00
[52] U.S. Cl. .................. 345/173; 345/179; 178/18
[58] Field of Search ........................ 178/18, 19, 20, 178/33; 345/174, 175, 176, 173, 179, 178, 177, 104; 174/35 R; 200/5 A

[56] References Cited

U.S. PATENT DOCUMENTS

| | | | |
|---|---|---|---|
| 3,862,360 | 1/1975 | Dill et al. | 178/7.3 D |
| 4,297,004 | 10/1981 | Nishimura et al. | 350/336 |
| 4,527,862 | 7/1985 | Arakawa | 350/334 |
| 4,717,989 | 1/1988 | De Barros | 361/818 |
| 4,785,136 | 11/1988 | Mollet | 174/35 R |
| 4,786,767 | 11/1988 | Kulhman | 200/5 A |
| 4,806,709 | 2/1989 | Evans | 178/19 |
| 4,853,497 | 8/1989 | Landmeier | 178/18 |
| 4,853,791 | 8/1989 | Ginther, Jr. | 358/247 |
| 5,063,600 | 11/1991 | Norwood | 382/13 |
| 5,218,173 | 6/1993 | Garwin et al. | 178/18 |
| 5,274,198 | 12/1993 | Landmeier | 178/18 |
| 5,381,160 | 1/1995 | Landmeier | 178/18 |

OTHER PUBLICATIONS

P. Lorrain, , D. Carson, F. Lorrain, "Electromagnetic Fields and Waves" pp. 524–529, 536–553. Freeman. New York. 1988.

*Primary Examiner*—Richard Hjerpe
*Assistant Examiner*—Xiao M. Wu
*Attorney, Agent, or Firm*—Jack R. Penrod; Paul J. Maginot

[57] ABSTRACT

An apparatus for a pen-based input system, such as personal communication device or notepad computer, which shields against RFI/EMI fields causing problems either in the internal electronics or in the environment surrounding the system. A digitizer used in such a system must be able to sense a location of a special pen used for inputting information. This digitizer is also a source of RFI/EMI fields. A shield of such RFI/EMI fields must allow the digitizer to work and reduce the amount of RFI/EMI released to the environment. A special transparent conductive layer, such as a coating of Indium-Tin-Oxide, beneath the pen input protective plate performs these two necessary functions. The conductive layer also shields the system internal electronics from external RFI/EMI sources such as attached cellular telephone systems or radio LAN systems.

26 Claims, 2 Drawing Sheets

1

APPARATUS FOR A STYLUS INPUT SYSTEM FOR SHIELDING RFI/EMI FIELDS

BACKGROUND OF THE INVENTION

The present invention relates to stylus input, notepad computer systems and personal communication devices, and more particularly to an apparatus for shielding RFI/EMI fields for stylus input notepad computer systems and personal communication devices.

Notepad computer systems are computer systems where the operator manually 'writes' onto a display screen using a stylus. Personal communication devices are notepad computers with an electromagnetic radiation link to another device such as a cellular telephone channel or a radio computer LAN. As the operator 'writes', the positions of the stylus are sensed by a digitizer. The digitizer converts the position information to graphic data that are transferred to the graphic processing portion of the notepad computer system. The graphic processing portion converts the graphic data into pixel data and displays the pixel data on a liquid crystal display (LCD) panel or other similar device. Thus, the 'writing' that the operator does with the stylus can be stored and/or displayed on the notepad computer system.

The digitizer uses an electromagnetic field to sense the various positions of the stylus as the operator 'writes'. The electromagnetic field that is transmitted from the digitizer to the stylus that the operator holds is partially absorbed and partially reflected by the stylus. Of the part that is absorbed by the stylus, most of it is either radiated or transmitted to the operator who then radiates and conducts this electromagnetic field into the surrounding environment. Once the electromagnetic field leaves the stylus and is either radiated or transmitted to the operator, it ceases to be a useful field and changes into a radio frequency interference/electromagnetic interference (RFI/EMI) field. As an RFI/EMI field, this field is subject to regulation by national agencies, such as the Federal Communications Commission in the United States. These agencies typically require that RFI/EMI fields emitted by equipment, such as a notepad computer, be limited to levels that will not affect other equipment.

RFI/EMI fields may also be transmitted from the digitizer directly to the operator if the operator touches or almost touches the display screen instead of or in addition to touching the stylus. So, some of the aforementioned national agencies also require that RFI/EMI fields emitted by a notepad computer while being operated by an operator be limited to levels that will not affect other equipment.

Besides the digitizer, the LCD panel, the electronic components on the computer system's processor board and the system cabling are sources for RFI/EMI fields that may be emitted through the display screen to the stylus and to the operator using the stylus. Unlike the digitizer RFI/EMI fields which are a side effect of the digitizing function, these RFI/EMI fields are completely spurious and have no useful purpose. Therefore, it is desirable to reduce these RFI/EMI fields as much as possible.

Personal communication devices have antennae that deliberately emit electromagnetic fields that are modulated in some manner to communicate information. Part of these emitted electromagnetic fields, typically, is radiated towards the personal communication device, its digitizer, its LCD panel and its electronic circuits. These electromagnetic fields that are not part of the communication channel can be a source of RFI/EMI fields that can interact with the digitizer, LCD panel, and personal communication electronic circuits and induce one or more single bit errors therein. Therefore, it is desirable to reduce the RFI/EMI fields that are radiated from an external antenna and are present at the internal circuits of a personal communication device.

It is an object of the present invention to provide a transparent, RFI/EMI shield apparatus that reduces the amount of RFI/EMI fields emitted by a combination of a notepad computer and an operator.

It is another object of the present invention to provide a RFI/EMI shield apparatus for a notepad computer that limits the RFI/EMI fields emitted by the notepad computer and yet allows a digitizer to sense the position of a stylus on its writing surface.

It is a further object of this invention to provide a transparent shield apparatus for a personal communicator device that reduces the RFI/EMI fields that are emitted at an antenna that reach the internal electronics of the personal communicator device.

SUMMARY OF THE INVENTION

Briefly stated, in accordance with one aspect of the invention the foregoing objects are achieved by providing an apparatus for a notepad computer for reducing RFI/EMI fields emitted therefrom. The apparatus has a digitizer and a protective transparent plate that is located above the digitizer. The protective transparent plate has a transparent conductive coating located thereon, on a side facing toward the digitizer. A conductor of the apparatus connects the transparent conductive coating to a ground element of the notepad computer. RFI/EMI fields emanating from the digitizer and other parts of the notepad computer are partially reflected, partially converted into RFI/EMI currents that are absorbed by the ground element and partially transmitted to any human operator that touches the protective transparent plate of the notepad computer with a stylus. The effect of the apparatus is that the amount of RFI/EMI field transferred to the environment by the stylus and the human operator is reduced.

In another aspect of the invention, the aforementioned objects are achieved by providing an apparatus for shielding internal circuits of a personal communication device from RFI/EMI fields that are radiated from an external antenna of said personal communication device. This apparatus includes a protective transparent plate forming a top surface of the personal communication device, a transparent conductive layer attached to the protective transparent plate on an inner surface thereof opposite the top surface, a conductor connected at one end to the transparent conductive coating, and a ground plane of the personal communication device connected to a second end of the conductor for absorbing currents induced in the transparent conductive layer by the RFI/EMI fields radiated from the antenna of the personal communication device.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
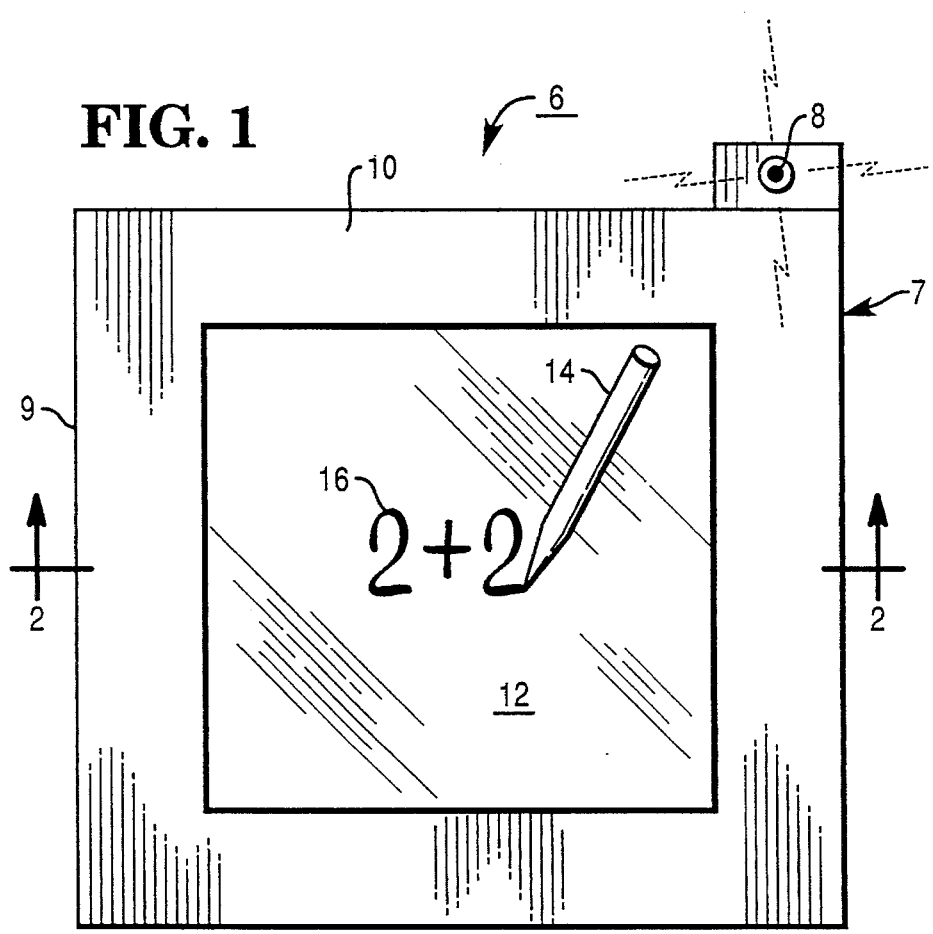
FIG. 1 is a plan view of a personal communication device.

Referring now to FIG. 1, a personal communication device 6 is shown in a top view. Personal communication device 6 has a notepad computer system 7. Personal communication device 6 also includes communication circuitry (not specifically shown) that transfers data between the notepad computer system 7 and some external radio channel such as a cellular telephone channel to a modem of an external computer system (not shown). Personal communicator 6 has an antenna 8 that is attached to or is an integral part of the notepad computer system 7 to aid in communication with the external computer system.

Personal communication device 6 has an enclosure 9 that contains a power supply, a battery, and the electronic components (all not shown) that make up such a device. Enclosure 9 has a bezel 10 which surrounds a protective transparent plate 12. Protective transparent plate 12 is transparent to permit a human operator to see into enclosure 9 and read a display therein.

The protective transparent plate 12 is made of glass, Lexan or some similar material that is transparent and resists scratches. This material must be scratch resistant not only to resist inadvertent scratches during transportation, but also because data entry may be by writing upon the top surface of the transparent protective plate 12 with a stylus 14. As an operator writes with the stylus 14, a display 16 marks the positions that the stylus has traversed by changing the shade of gray or color of the display 16 at locations corresponding to those positions.

Figure 2:
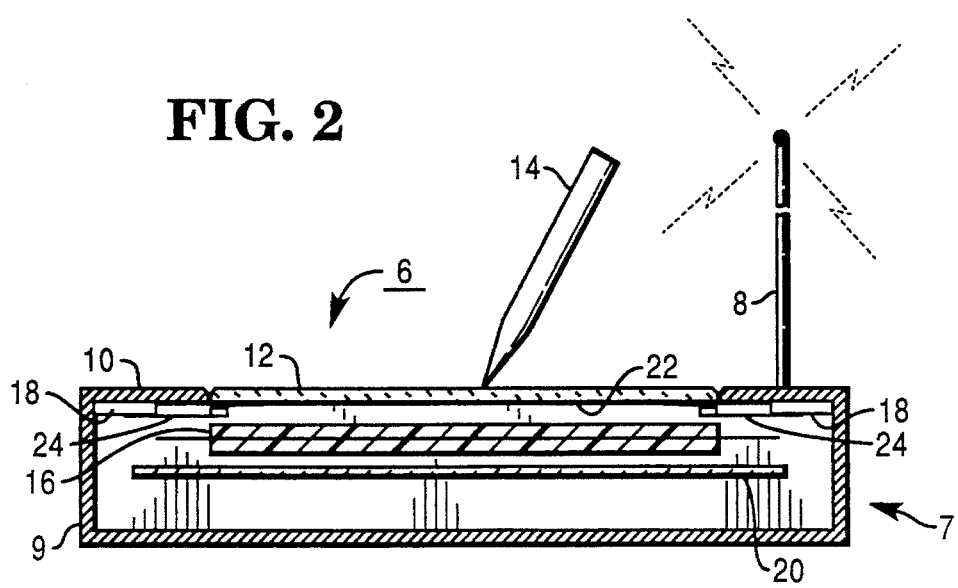
FIG. 2 is a section view along II—II of FIG. 1 with the processor board, memory and power supply omitted to show details of the invention.

Referring now to FIG. 2, internal details of the personal communication device 6 will be shown in this cross section. Enclosure 9 is typically made of a rugged plastic. This rugged plastic is typically non-transparent because there is typically no need to see inside the enclosure 9 except to read the display 16. Thus, there is no reason not to add metalization 18 on the inside of the enclosure 9 to shield against radio frequency interference and electromagnetic interference (RFI/EMI) fields that are generated by the electrical and electronic components of the notepad computer 7. Metalization 18 also shields against radio frequency electromagnetic radiation emitted from antenna 8 by means of communication circuits (not shown) of the personal communication device 6.

Metalization 18 may be a thin foil, a conductive paint, or some similar current conducting material. Such metalization 18 is not used one the transparent protective plate 12 because typically it is not transparent. Thus, the area beneath protective transparent plate 12 is not shielded against various RFI/EMI field sources as the rest of the enclosure 9.

Protective transparent plate 12 is physically attached to and supported by the rest of the enclosure 9. Immediately below protective transparent plate 12 is display 16, which preferably is a liquid crystal display (LCD) type of panel or similar device. The panel may be any of a number of LCD displays or arrays which are well known in the art, such as the ones made by Sharpe Corporation of Japan. Such displays are constantly subjected to switching signals during use and are one source of RFI/EMI fields.

A digitizer 20 is located below the display 16. Digitizer 20 constantly senses the position of the stylus 14 as it writes upon the transparent protective plate 12. Preferably, stylus 14 is a passive device and its position is capacitively sensed by the digitizer 20. The proximity of the stylus to part of the digitizer 20 is capacitively sensed and transformed by the digitizer and the notepad computer 6 into x and y coordinates. The notepad computer 7 records these locations and forms a trace on the display 16 that corresponds to the positions that the stylus has moved through.

The digitizer 20 works by transmitting an electromagnetic field up to the protective transparent plate 12. Stylus 14 if it is writing upon the protective transparent plate 12 will partially reflect the electromagnetic field back to the digitizer 20 as the means of sensing. Unfortunately, stylus 14 will also partially radiate and/or conduct the electromagnetic field from the digitizer 20 to its immediate surroundings (including the operator) as an RFI/EMI field. For sensitivity purposes, the amount of electromagnetic field from the digitizer 20 present at the top surface of the protective transparent plate 12 to be reflected by the stylus 14 should be as large as possible. Conversely, for RFI/EMI field reduction purposes, the amount of electromagnetic field from the digitizer 20 present at the top surface of the protective transparent plate 12 to be radiated and/or conducted via the stylus 14 into the surrounding environment should be as small as possible.

Below the digitizer 20 are the typical electrical and electronic components and circuit boards that would be found in a personal communication device or notepad computer. Such electrical and electronic components are known for being sources of RFI/EMI fields. So much so that computer manufactures are regulated by the Federal Communications Commission to keep the RFI/EMI fields emitted by such equipment to reasonable levels.

Protective transparent plate 12 has a conductive layer in the form of a conductive coating 22 on its inner surface in order to reduce RFI/EMI fields emitted therethrough. This coating is made of a mixture of Indium and Tin Oxide, know as Indium-Tin-Oxide. The surface resistance of the conductive coating 22 is a function of the length and width of the protective transparent plate 12 and the coating thickness. As mentioned previously, for maximum sensitivity the resistance of the coating should be very large, i.e. infinity, while for maximum RFI/EMI reduction the resistance of the coating should be very small, i.e. zero. In the present invention, a surface resistance of the conductive coating 22 across the entire protective transparent plate 12 is at least 10 ohms was found to be the lowest value that allowed for digitizer function and RFI/EMI reduction. For notepad computer production the range of resistance from 16 ohms to 20 ohms was found to be the best compromise between the conflicting system requirements of digitizer sensitivity and RFI/EMI field reduction.

Conductive coating 22 is connected by a plurality of conductors 24 to the metalization 18. The conductors 24 will conduct currents that RFI/EMI fields induce in the conductive coating 22 into the metalization 18 where they can be dissipated by the comparatively lower resistance thereof. In this manner, metalization 18 acts as a ground plane for the personal communication device 6.

Conductive coating 22, with its connections to metalization 18, will similarly shield LCD display 16, digitizer 20 and other computer circuits within enclosure 9 from the radio frequency emissions from antenna 8. Such shielding reduces the amount of RFI/EMI present within enclosure 9 and thereby reduces the likelihood that such RFI/EMI will cause one or more bit errors in the digital circuitry of the notepad computer 7.

Figure 3:
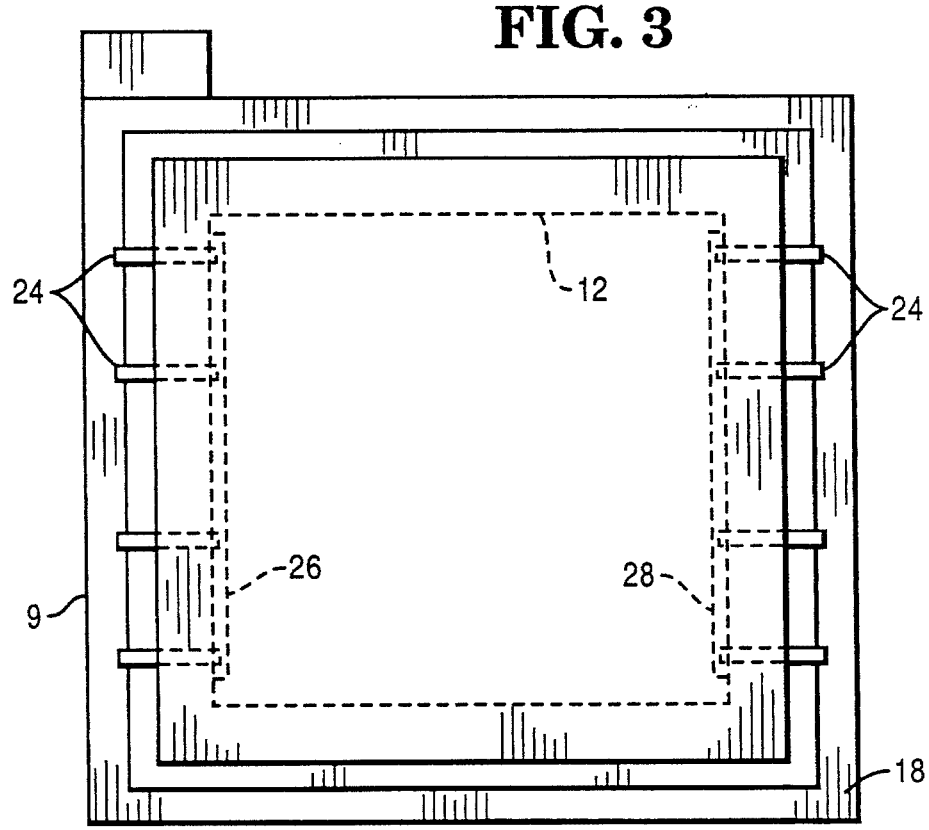
FIG. 3 is a rear view of the frame, protective panel, LCD panel, and digitizer sub-assembly of the device shown in FIG. 1.

FIG. 3 is a rear view of the personal communication device 6 with the rear of the enclosure 9 and the electronics removed to show the digitizer 20, the conductors 24 and the metalization 18.

Figure 4:
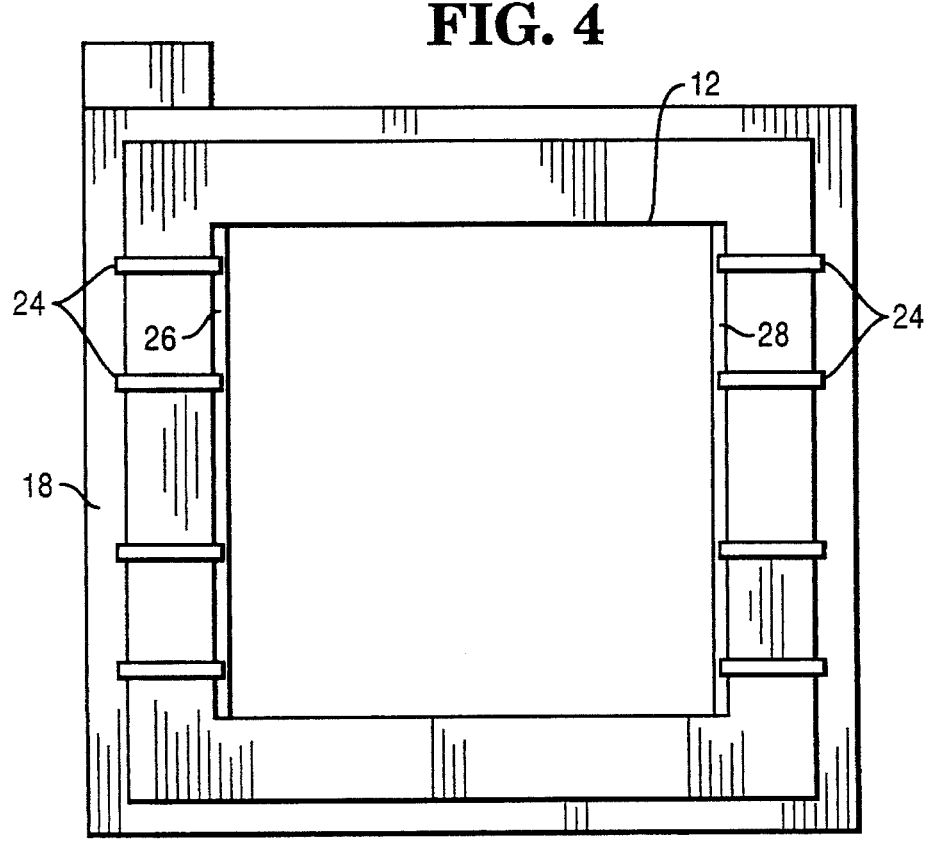
FIG. 4 is the same as FIG. 3 except that the digitizer and the LCD panel have been removed to show details of the invention more clearly.

FIG. 4 is the same view as FIG. 3, but with the digitizer 20 and the display 16 removed to show the inner side of the protective transparent plate 12 and its connections more clearly. Bus bars 26, 28 are formed on the inner side of protective transparent plate 12 on opposing edges thereof. These bus bars 26, 28 are in contact with the conductive coating 22 along their entire length. The net resistance of the conductive coating 22 is measured between the bus bars 26 and 28 and referred to as the surface resistance. This is the resistance that is kept in the range of 16 to 20 ohms by varying the thickness of the conductive coating 22. The plural conductors 24 are connected from various points along bus bars 26, 28 to the metalization 18. This metalization 18 is typically connected to the return or ground of the personal communication device 6 to increase the effective size of the ground plane and its ability to absorb RFI/EMI currents. This allows the currents induced by the RFI/EMI fields to be dissipated being radiated or conducted into the surrounding environment.

Thus, it will now be understood that there has been disclosed an apparatus for reducing RFI/EMI fields emitted from a notepad computer while not inhibiting the function of its digitizer that uses capacitive sensing of a passive stylus. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A notepad computer, comprising:

a cabinet having an opening and defining a chamber, said cabinet having a first RFI/EMI shield positioned thereon;

a digitizer positioned within the chamber of said cabinet and producing an electromagnetic field;

a display device located over said digitizer;

a transparent plate located substantially within the opening of said cabinet and over said display device, said transparent plate having an outer side and an inner side, wherein the electromagnetic field produced by said digitizer is able to be altered by contacting the outer side of said transparent plate with an input stylus; and a transparent second RFI/EMI shield located between said transparent plate and said digitizer.

2. An apparatus, according to claim 1, wherein:

said transparent second RFI/EMI shield comprises an Indium-Tin-Oxide material.

3. An apparatus, according to claim 2, wherein:

said transparent plate is made of glass.

4. An apparatus, according to claim 2, wherein:

a surface resistance of said second RFI/EMI shield is at least ten ohms.

5. An apparatus, according to claim 1, wherein:

said transparent plate is made of glass;

said transparent second RFI/EMI shield comprises an Indium-Tin-Oxide material; and a surface resistance of said second RFI/EMI shield is at least ten ohms.

6. An apparatus, according to claim 1, wherein:

said second RFI/EMI shield comprises a coating located on the inner side of said transparent plate.

7. An apparatus, according to claim 6, wherein:

said transparent second RFI/EMI shield comprises a Indium-Tin-Oxide material.

8. An apparatus, according to claim 7, wherein:

a surface resistance of said transparent second RFI/EMI shield is at least ten ohms.

9. An apparatus, according to claim 8, wherein:

said surface resistance of transparent second RFI/EMI shield is in a range of sixteen to twenty ohms.

10. An apparatus, according to claim 9, wherein:

said transparent plate is made of glass.

11. A notepad computer, comprising:

a digitizer which produces an electromagnetic field;

a transparent plate located above said digitizer, said transparent plate having an outer side and an inner side, wherein the electromagnetic field produced by said digitizer is able to be altered by contact the outer side of said transparent plate with an input stylus;

a transparent conductive layer located between said transparent plate and said digitizer; and a ground conductor electrically connected to said transparent conductive layer.

12. An apparatus according to claim 11, further comprising:

an LCD display located between said transparent conductive layer and said digitizer.

13. An apparatus, according to claim 12, wherein:

a surface resistance of said transparent conductive layer is great enough to allow said digitizer to sense successive locations of said input stylus and small enough to reduce the amount of RFI/EMI fields emitted from said notepad computer.

14. An apparatus, according to claim 13, wherein:

said transparent conductive layer is a coating on said transparent plate.

15. An apparatus, according to claim 14, wherein:

said transparent conductive layer comprises an Indium-Tin-Oxide material.

16. An apparatus, according to claim 15, wherein:

a surface resistance of said transparent conductive layer measured from one edge of said transparent plate to an opposite edge of said transparent plate is at least 10 ohms.

17. An apparatus, according to claim 16, wherein:

a surface resistance of said transparent conductive layer measured from one edge of said transparent plate to an opposite edge of said transparent plate is less than 20 ohms.

18. An apparatus, according to claim 17, wherein:

said digitizer is capacitively coupled to said input stylus.

19. A notepad computer, comprising:

a cabinet having an opening and defining a chamber, said cabinet having a first conductive layer positioned thereon;

a digitizer positioned within the chamber of said cabinet and producing an electromagnetic field;

a transparent plate having a top surface and a bottom surface, wherein the electromagnetic field produced by said digitizer is able to be altered by contacting the top surface of said transparent plate with an input stylus;

a transparent second conductive layer attached to the bottom surface of said transparent plate; and a ground plane electrically connected to said transparent second conductive layer for absorbing currents induced in said transparent second conductive layer.

20. An apparatus, according to claim 19, wherein:

said transparent second conductive layer comprises an Indium-Tin-Oxide material.

21. An apparatus, according to claim 20, wherein:

a surface resistance of said transparent second conductive layer measured from one edge of said transparent plate to an opposite edge of said transparent plate is at least 10 ohms.

22. An apparatus, according to claim 21, wherein:

a surface resistance of said transparent second conductive layer measured from one edge of said transparent plate to an opposite edge of said transparent plate is less than 20 ohms.

23. A notepad computer, comprising:

a cabinet having an opening and defining a chamber, said cabinet having a first RFI/EMI shield positioned thereon;

a digitizer positioned within the chamber of said cabinet and producing an electromagnetic field;

a transparent plate positioned substantially within the opening of said cabinet and having a top surface and a bottom surface, wherein the electromagnetic field produced by said digitizer is able to be altered by contacting the top surface of said transparent plate with an input stylus;

a display device interposed between said transparent plate and said digitizer; and a transparent second RFI/EMI shield positionable between the input stylus and said digitizer when the input stylus is contacting the top surface of said transparent plate.

24. The notepad computer of claim 23, wherein said transparent second RFI/EMI shield is interposed between said transparent plate and said display device.

25. The notepad computer of claim 24, wherein said transparent second RFI/EMI shield is coated on the bottom surface of said transparent plate.

26. The notepad computer of claim 25, wherein said transparent second RFI/EMI shield comprises an Indium-Tin-Oxide material.

\* \* \* \* \*